US009608743B2

(12) United States Patent
Itkin

(10) Patent No.: US 9,608,743 B2
(45) Date of Patent: Mar. 28, 2017

(54) METHODS AND DEVICES FOR DETERMINING INTERMODULATION DISTORTIONS

(71) Applicant: Intel IP Corporation, Santa Clara, CA (US)

(72) Inventor: Grigory Itkin, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/935,416

(22) Filed: Nov. 8, 2015

(65) Prior Publication Data

US 2016/0134311 A1 May 12, 2016

(30) Foreign Application Priority Data

Nov. 10, 2014 (DE) .................. 10 2014 116 338

(51) Int. Cl.
*H04B 17/00* (2015.01)
*H04B 17/20* (2015.01)

(52) U.S. Cl.
CPC .................................. *H04B 17/20* (2015.01)

(58) Field of Classification Search
CPC .................................. H04B 17/20; H04B 1/16
See application file for complete search history.

(56) References Cited

U.S. PATENT DOCUMENTS

| | | | |
|---|---|---|---|
| 2006/0160510 A1* | 7/2006 | Seppinen | H04B 17/21 455/232.1 |
| 2009/0156147 A1* | 6/2009 | Rofougaran | H04B 1/1607 455/226.2 |
| 2009/0258629 A1* | 10/2009 | Ritchey | H03D 7/161 455/313 |
| 2010/0117693 A1* | 5/2010 | Lorg | H03D 7/163 327/156 |
| 2013/0029626 A1* | 1/2013 | Chen | H04B 15/04 455/334 |
| 2014/0155014 A1* | 6/2014 | Leung | H03D 7/165 455/318 |
| 2015/0349834 A1* | 12/2015 | Chakraborty | H04B 1/40 455/75 |

FOREIGN PATENT DOCUMENTS

WO WO-2010/042295 A2 4/2010

OTHER PUBLICATIONS

Office Action dated Sep. 26, 2016 for Taiwanese Patent Application No. 104132704 (with English translation).

* cited by examiner

*Primary Examiner* — Freshteh N Aghdam
(74) *Attorney, Agent, or Firm* — Schiff Hardin LLP

(57) ABSTRACT

A method (300) for determining inter-modulation distortions products of a mixing stage includes: driving (301) a signal input of the mixing stage based on an input signal, wherein an amplitude of the input signal is switched between a first level and a second level, and wherein a frequency of switching the amplitude is smaller than a frequency of the input signal; detecting (302) at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and determining (303) the inter-modulation distortions based on the first output signal and the second output signal.

19 Claims, 12 Drawing Sheets

METHODS AND DEVICES FOR DETERMINING INTERMODULATION DISTORTIONS

FIELD

The disclosure relates to methods and devices for internal determining intermodulation distortions and calibrating a mixing stage based thereupon. The disclosure further relates to radio receivers using such methods and devices.

BACKGROUND

Signals transmitted between components of a wireless communication network may include different kinds of unwanted components which inputted to nonlinear unit can disturb receiver performance (intermodulation distortions), in particular intermodulation of second order generated when two radio frequency components appear at the input of the mixing stage of the radio receiver. Methods and devices employed in wireless communication networks constantly have to be improved. In particular, it may be desirable to measure intermodulation distortions and to calibrate the radio receiver by using the measured intermodulation distortion products.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The methods and devices described herein may be based on intermodulation distortions, intermodulation products, in particular intermodulation products of second order. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on CDMA, WCDMA, an LTE and/or OFDM standard or based on a WiFi standard and in particular MIMO communication systems. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

Figure 2:
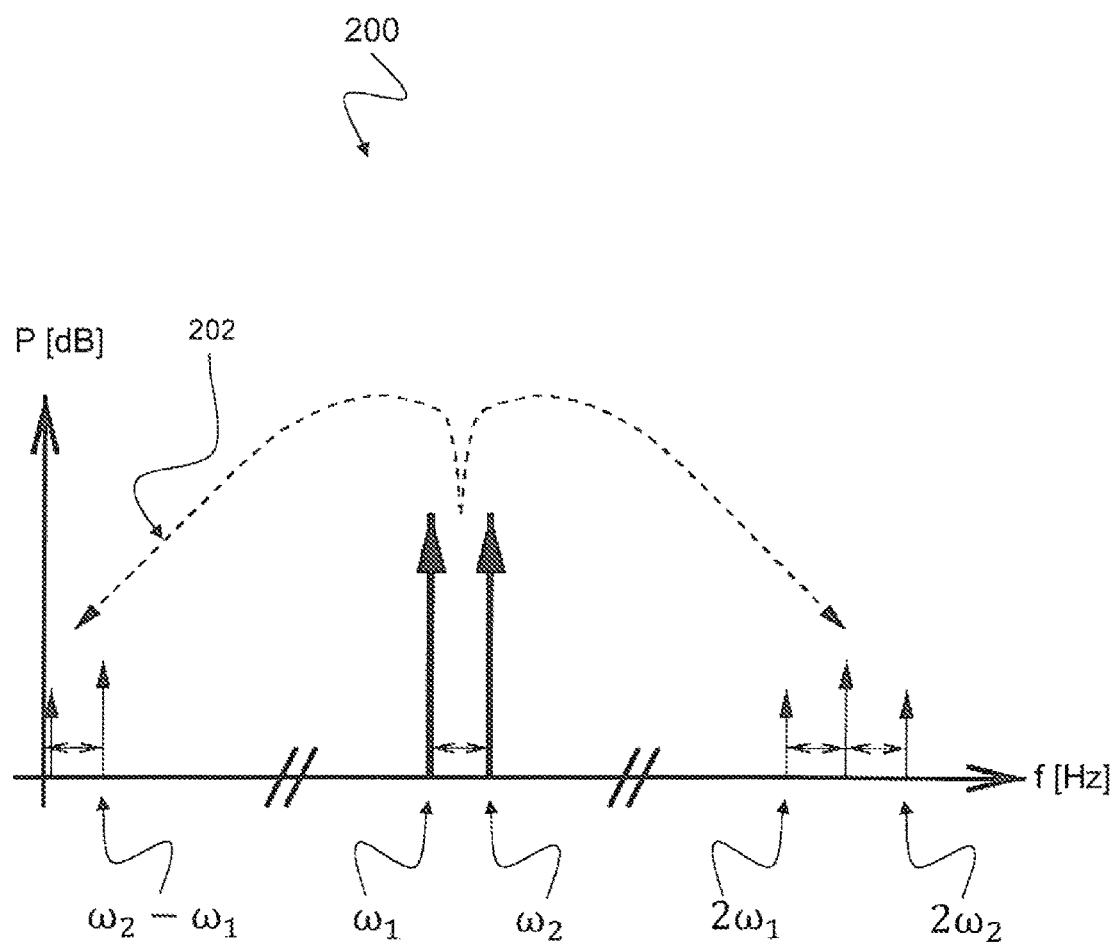
FIG. 2 is a schematic diagram of a power spectrum 200 at the radio frequency (RF) input of a down-converting mixer of a radio receiver illustrating intermodulation products of second order 202.

In the following, intermodulation distortions are described. Intermodulation or intermodulation distortion (IMD) may be described as the unwanted amplitude modulation of signals containing two or more different frequencies in a system with nonlinearities. The intermodulation between each frequency component will form additional signals at frequencies that are not just at harmonic frequencies, i.e. integer multiples of either, but also at the sum and difference frequencies of the original frequencies and at multiples of those sum and difference frequencies. Intermodulation may be caused by non-linear behavior of the signal processing units being used, such as mixers in the radio receiver. One of very critical intermodulation distortions are intermodulation products of second order as depicted in FIG. 2.

In the following, mixing stages and mixers are described. A mixing stage including a mixer or frequency mixer is a nonlinear electrical circuit that creates new frequencies from two signals applied to it. When two signals at frequencies $f_1$ and $f_2$ are applied to a mixer of a mixing stage it produces new signals at the sum $f_1+f_2$ and difference $f_1-f_2$ of the original frequencies. Other frequency components may also be produced in a practical frequency mixer. A mixing stage may be included in a radio receiver and/or a radio transmitter.

Methods and devices as described in the following may be applied with complex mixing stages based on sine and cosine mixing signals. However, such methods and devices may also be applied with complex mixing stages based on other orthogonal signal pairs, e.g. rectangular signal pairs including a plurality of harmonics.

Figure 1:
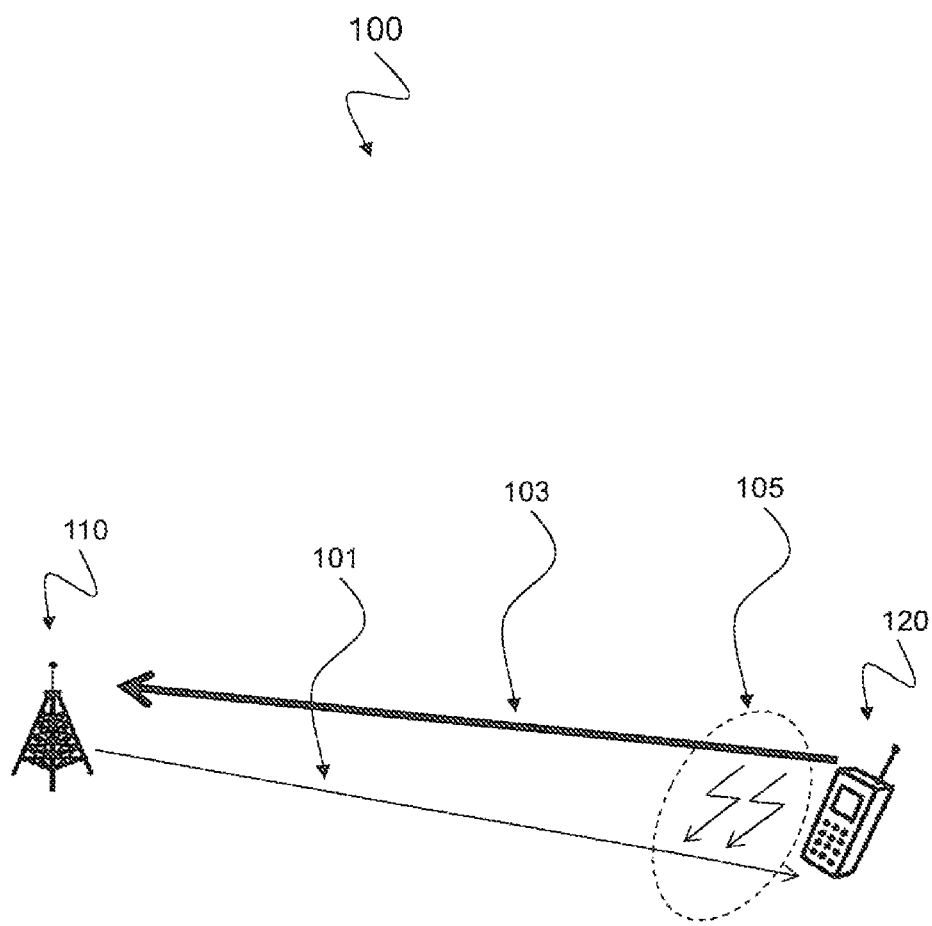
FIG. 1 is a schematic diagram of a radio communication 100 illustrating intermodulation distortions 105 inside a mixer of a radio receiver of the user equipment 120.

FIG. 1 is a schematic diagram of a radio communication 100 illustrating intermodulation distortion products 105 at a mixer output of a radio receiver of the user equipment 120. In a radio communication 100 between a base station 110 and a UE 120 a strong transmit signal 103 transmitted by the UE 120 may interfere with a weak receive signal 101 received from the base station 110. In particular intermodulation distortions at the mixer output of the radio receiver of the UE 120 may distort the communication between both devices.

FIG. 2 is a schematic diagram of a power spectrum 200 at the RF input of a down-converting mixer of a radio receiver illustrating intermodulation products of second order 202. The power spectrum 200 depicts signal power P in dB over frequency f in Hz.

When two RF components $\omega_1$ and $\omega_2$ appear at the RF input of a down-converting mixer there may be a low frequency component $\omega_2-\omega_1$ generated at the mixer output because of intermodulation distortions. The level of inter-modulation distortions (IM), in particular intermodulation distortions of second order (IM2) may depend on different mixer working parameters such as for example DC Voltage, Bias current, mixer thresholds, its symmetry, etc.

The IM2 product level can be measured directly by using two tone RF input signal or indirectly by measuring different DC parameters. Indirect measurements may be based on theoretical assumptions that the IM2 level is more or less connected to different mixer's DC controlling parameters like, for example, differential DC voltages at each mixer output pair or quartet. Direct measurements may require special RF signals that may be connected to the mixer's input from outside or may be generated inside the transceiver chip.

Direct measurements may be performed during factory calibration.

Indirect measurements may be realized with the help of transmit (TX) signals routed inside the RF part of the chip or outside the chip by using additional printed circuit board (PCB) space. Routing TX signals through the receive (RX) section of a chip may be dangerous because of unwanted crosstalk between the TX and RX signal lines. The layout of additional TX signals on PCB may require a lot of additional PCB place and may issue unwanted cross couplings between TX and RX signals. Additionally, it may not always be possible to use the TX signal path and/or its Local Oscillator (LO) for IM2 calibrations because of differences in TX and RX operating timelines.

Methods and devices according to the disclosure may be applied to both scenarios, factory measurements and/or calibration as well as field measurements and/or calibration. Methods and devices according to the disclosure may implement direct IM2 measurements without the need of using TX signal paths or its local oscillators. By applying such methods and devices a lot of chip area can be saved because no analogue blocks like for example digital-to-analog converters (DACs) and amplitude modulation (AM) modulators are required. Methods and devices according to the disclosure may be based on using a second RX local oscillator (LO2), which normally exist in modern communication devices tuned to TX frequency (or possible close to it) and a low frequency pulse modulation generator to emulate an RF input signal with changing magnitude as described below with respect to FIGS. 3 to 11.

Figure 3A:
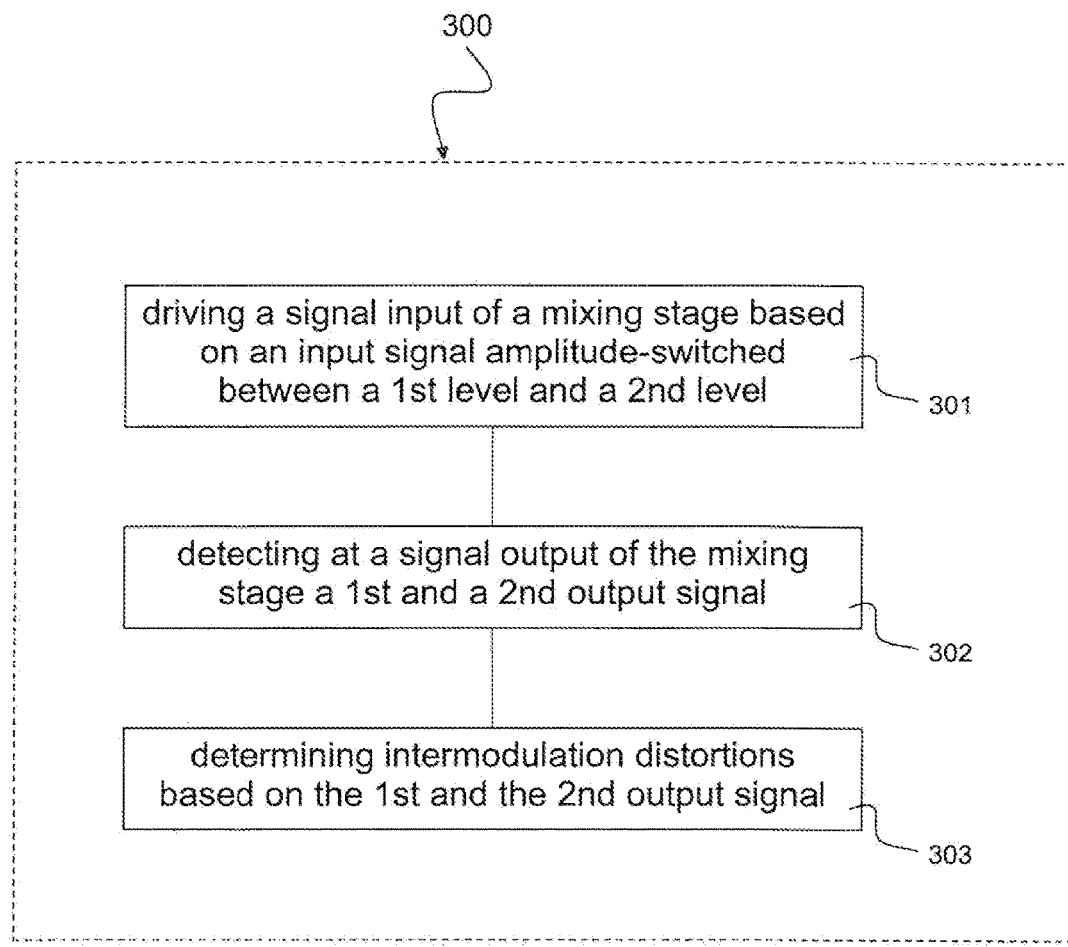
FIG. 3a is a schematic diagram of a method 300 in accordance with the disclosure for determining intermodulation distortions of a mixing stage.

FIG. 3a is a schematic diagram of a method 300 in accordance with the disclosure for determining intermodulation distortions of a mixing stage, e.g. a mixing stage 401 as described below with respect to FIGS. 4 and 5.

The method 300 may include an act of driving 301 a signal input of the mixing stage based on an input signal, wherein an amplitude of the input signal is switched between a first level and a second level, and wherein a frequency of switching the amplitude is smaller than a frequency of the input signal, in particular much smaller than a frequency of the input signal. Hereinafter, a frequency of switching the amplitude being much smaller than a frequency of the input signal means that a settling time of the low-pass filters of the mixing stage is within the time period of the first level or the second level, i.e., the output of the mixing stage has reached a stable state, e.g. according to the description below with respect to FIGS. 9 and 10. The method 300 may include an act of detecting 302 at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level. The method 300 may include an act of determining 303 the inter-modulation distortions based on the difference between first output signal and the second output signal.

The inter-modulation distortion's level may be determined based on a difference between the first output signal and the second output signal. Operational parameters of the mixing stage may be maintained between successive first levels and second levels of the amplitude of the input signal as described below and shown below with respect to FIG. 10. The operational parameters of the mixing stage may be modified when the amplitude of the input signal is switched from the second level to the first level as described below and shown below with respect to FIG. 10. The operational parameters of the mixing stage may comprise a DC voltage, a bias current, a mixing stage threshold, and/or a mixing stage symmetry parameter and others.

A time interval for switching the amplitude of the input signal to the first level or to the second level shall be greater than a low pass filter settling time of the mixing stage as shown below with respect to FIG. 10.

Figure 3B:
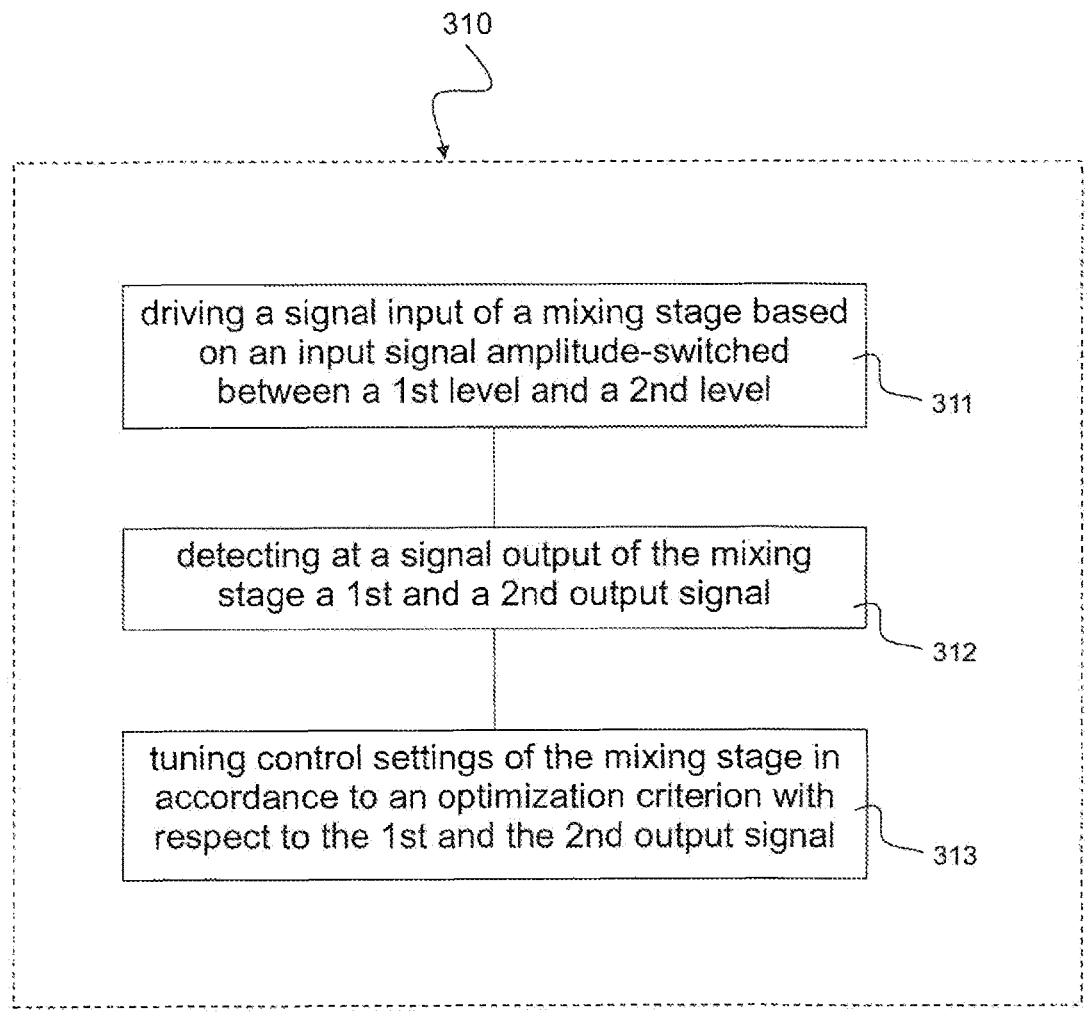
FIG. 3b is a schematic diagram of a method 310 in accordance with the disclosure for tuning a mixing stage.

FIG. 3b is a schematic diagram of a method 310 in accordance with the disclosure for tuning a mixing stage, e.g. a mixing stage 401 as described below with respect to FIGS. 4 and 5.

The method 310 may include an act of driving 311 a signal input of the mixing stage with an input signal, wherein an amplitude of the input signal is switched between a first level and a second level, and wherein a frequency of switching the amplitude is smaller than a frequency of the input signal. The method 310 may include an act of detecting 312 at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level. The method 310 may include an act of tuning 313 control settings, in particular at least one operational parameter of the mixing stage in accordance with an optimization criterion with respect to the differences between first output signal and the second output signal.

At least one operational parameter of the mixing stage may be maintained between successive first levels and second levels of the amplitude of the input signal and modified when the amplitude of the input signal is switched from the second level to the first level as described below with respect to FIG. 10.

The optimization criterion may be based on a minimum difference between the first output signal and the second output signal. The method 310 may further comprise switching the mixing stage to a calibration mode in which the mixing stage is disabled for receiving any input communication signals when performing the tuning of the mixing stage. The method 310 may further comprise calibrating the mixing stage with operational parameters fulfilling the optimization criterion when enabling the mixing stage for receiving input communication signals.

Methods and devices according to the disclosure may be based on the fact that intermodulation products of second order (IP2) are proportional to magnitude of both input components $A_1$ of $\omega_1$ and $A_2$ of $\omega_2$ according to the following relation:

$$IP2 = C \cdot A_1 \cdot A_2 \cdot \cos(\omega_1 - \omega_2)$$

By using $\omega_1 = \omega_2$ and $A_1 = A_2$ the IP2 level is proportional to $A = A_1 = A_2$ according to:

$$IP2 = C \cdot A^2.$$

When the magnitude A of the input signal is changing with low frequency manipulation the IP2 product at the mixer output will get pulsed response proportional to its coefficient of distortions C. Measurements of DC levels at the mixer output during HIGH and LOW phase of the input RF magnitude can be used as relative indication of the C coefficient during search procedures for best IM2 mixer settings.

To create an input signal with pulse modulation, a second RX local oscillator (LO2) may be used. Second local oscillator LO2 is normally a part of modern communication systems. The oscillator LO2 shall be tuned to the wanted TX frequency in the FDD communication system, i.e. the carrier frequency of the transmit signal or possible close to it. An amplitude manipulation may be created by using a switchable signal attenuator as described below with respect to FIG. 6. Different high and low levels for measurement intervals can be selected using the variable attenuator 603 and the levels controller 605 as shown below in FIG. 6.

Figure 4:
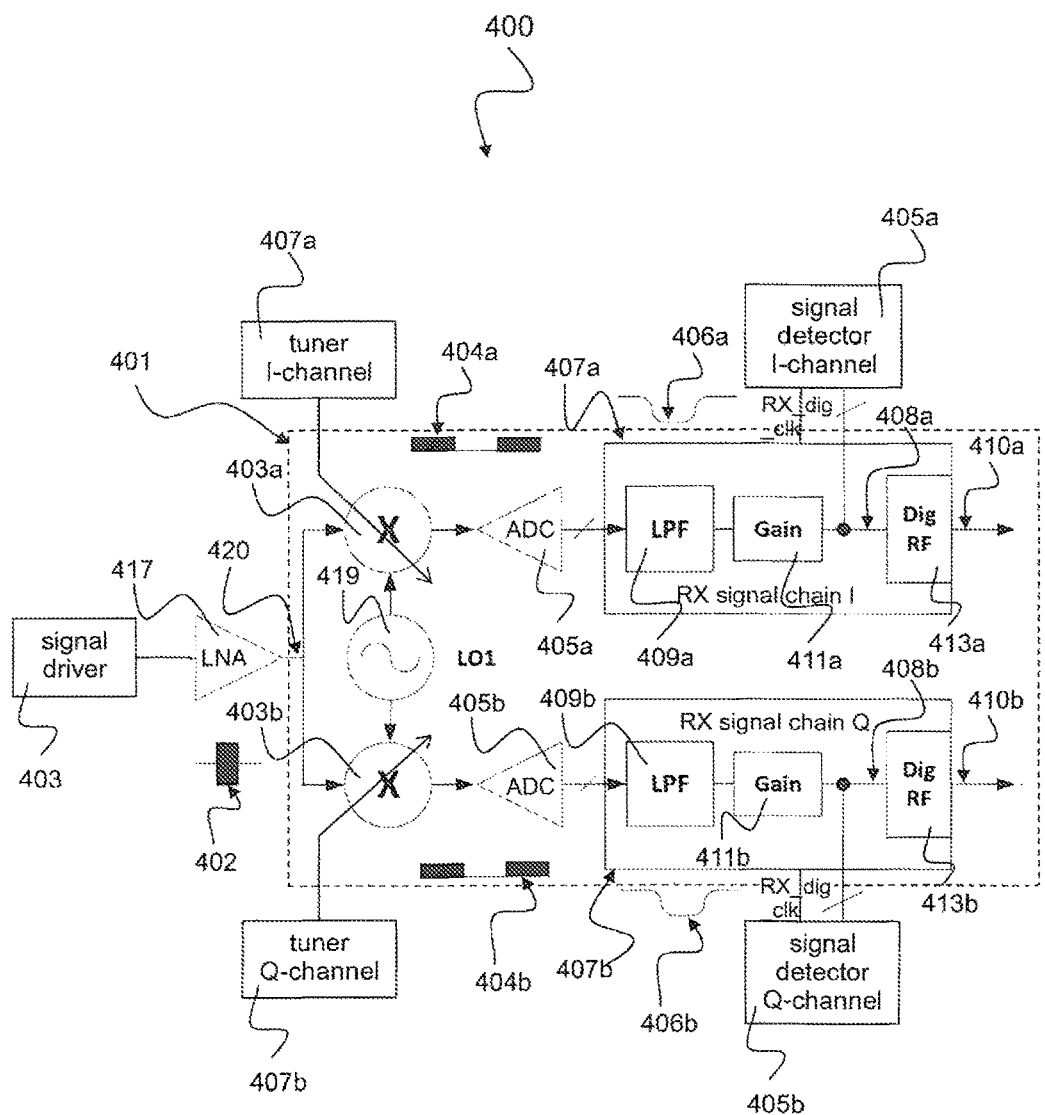
FIG. 4 is a schematic diagram of a calibration device 400 in accordance with the disclosure for calibrating a mixing stage of receiver 401 comprising a signal input 420 and a signal output 408a, 408b.

FIG. 4 is a schematic diagram of a calibration device 400 in accordance with the disclosure for calibrating a mixing stage 401 comprising a signal input 420 and a signal outputs 408a, 408b.

The mixing stage 401 may include an in-phase (I) channel mixer 403a and a quadrature-phase (Q) channel mixer 403b for mixing an input signal 402 received at an input 420 with a local oscillator 419 (LO1). The I channel mixer 403a may provide an I channel mixer output signal 404a at its output that may be converted by an I channel analog-digital converter (ADC) 405a to a digital signal and passed through an I channel RX signal chain 407a including a low pass filter 409a, a gain element 411a and a digital radio frequency stage 413a to provide an I channel RF signal 410a. The Q channel mixer 403b may provide a Q channel mixer output signal 404b at its output that may be converted by a Q channel ADC 405b to a digital signal and passed through a Q channel RX signal chain 407b including a low pass filter 409b, a gain element 411b and a digital radio frequency stage 413b to provide a Q channel RF signal 410b.

The calibration device 400 may include a signal driver 403, an I-channel tuner 407a, a Q-channel tuner 407b, an I-channel signal detector 405a and a Q-channel signal detector 405b. A low noise amplifier (LNA) 417 may be coupled between the signal driver 403 and the input 420 of the mixing stage 401.

The I-channel tuner 407a may be used to tune operational parameters of the I-channel mixer 403a such as for example DC Voltage, Bias current, mixer thresholds, its symmetry etc. The Q-channel tuner 407b may be used to tune operational parameters of the Q-channel mixer 403b such as for example DC Voltage, Bias current, mixer thresholds, its symmetry etc.

The I channel signal detector 405a may detect an I channel RX output signal 406a at an output 408a of the gain element 411a of the I-channel RX signal chain 407a. The Q channel signal detector 405b may detect a Q channel RX output signal 406b at an output 408b of the gain element 411b of the Q-channel RX signal chain 407b.

The I-channel signal detector 405a may use an RX digital clock signal RX_dig_clk to synchronize with the I-channel RX signal chain 407a of the mixing stage 401. The Q channel signal detector 405b may use the RX digital clock signal RX_dig_clk to synchronize with the Q-channel RX signal chain 407b of the mixing stage 401.

The I-channel signal detector 405a and the Q channel signal detector 405b may synchronize with the signal driver 403 and the I- and Q-channel tuners 407a, 407b to detect the I- and Q-channel RX output signals 406a, 406b. An exemplary synchronization is described below with respect to FIGS. 5 to 10.

The calibration device 400 may be used for calibrating a mixing stage 401 comprising a signal input 420 and a signal output 408a, 408b. The signal driver 403 may be connectable to the signal input 420. The signal driver 403 may be configured to drive the signal input 420 with an input signal 402, wherein an amplitude of the input signal 402 is switched between a first level and a second level, and wherein a frequency of switching the amplitude is smaller than a frequency of the input signal 402.

The signal detector 405a, 405b may be connectable to the mixing stage output 408a, 408b. The signal detector 405a, 405b may be configured to detect at the signal output 408a, 408b a first output signal 406a, 406b responsive to the driving of the signal input 420 with the input signal 402, wherein the amplitude of the input signal 402 is switched to the first level, and a second output signal 406a, 406b responsive to the driving of the signal input 420 with the input signal 402, wherein the amplitude of the input signal 402 is switched to the second level.

The tuner 407a, 407b may be configured to tune at least one operational parameter of the mixer 403a, 403b in accordance with an optimization criterion with respect to the difference between the first output signal and the second output signal 406a, 406b.

The optimization criterion may be based on a minimum difference between the first output signal and the second output signal 406a, 406b. The calibration device 400 may include a switch (not depicted in FIG. 4) configured to switch the signal input 420 of the mixing stage 401 to the signal driver 403 when the mixing stage 401 is in a calibration mode and to switch the signal input 420 of the mixing stage 401 to a receive port configured to receive communication signals when the mixing stage 401 is not in the calibration mode.

Figure 8:
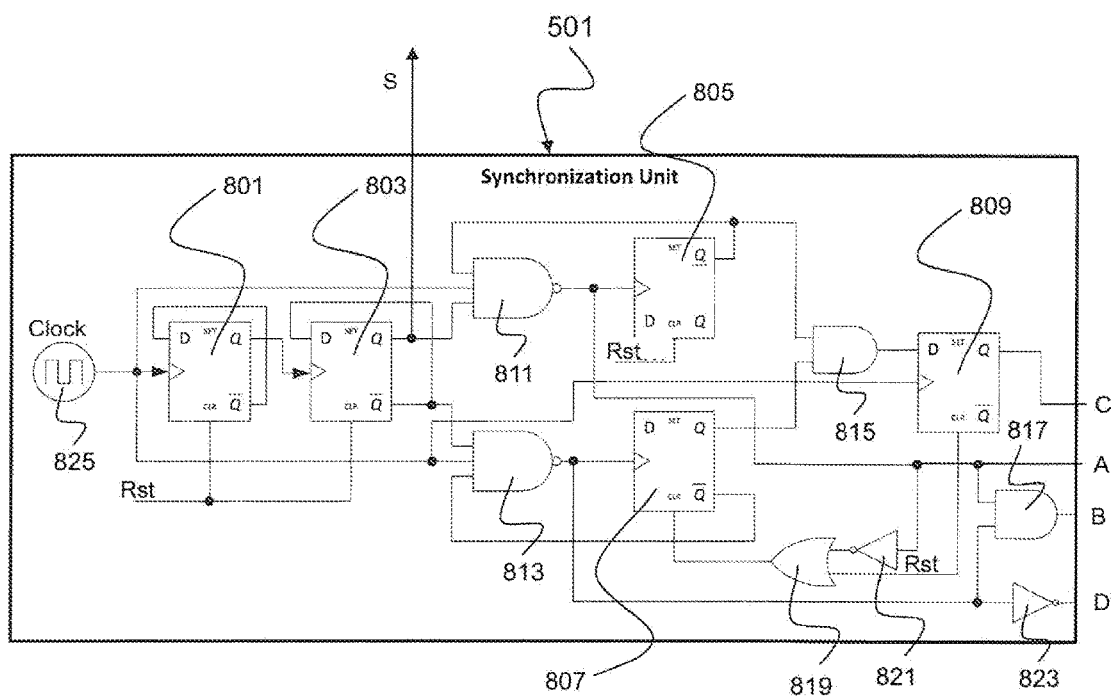
FIG. 8 is a schematic diagram of a synchronization unit 501 of the radio receiver 500 depicted in FIG. 5 in accordance with the disclosure.

The calibration device 400 may be integrated with the mixing stage 401 on a chip or may be an external unit connectable to the mixing stage 401. The calibration device 400 may include a synchronization unit, e.g. a synchronization unit 501 as depicted in FIGS. 5 and 8, configured to synchronize the signal driver 403 between driving the signal input 420 with the input signal 402, wherein the amplitude of the input signal 402 is switched to the first level, and driving the signal input 420 with the input signal 402, wherein the amplitude of the input signal 402 is switched to the second level.

The synchronization unit 501 may include a synchronization clock, e.g. a clock 825 as described below with respect to FIG. 8, wherein synchronizing of the signal driver 403 may be based on the synchronization clock. A frequency of the synchronization clock 825 shall be smaller, in particular much smaller than a frequency of a local oscillator LO1 419 and LO2 of the mixing stage 400.

The signal driver 403 may include a variable attenuator, e.g. a variable attenuator 603 as described below with respect to FIG. 6 that may be configured to attenuate the input signal 402 in accordance with an attenuation level. The signal driver 403 may include a levels controller 605 that may be configured to control the attenuation level of the variable attenuator 603.

A first attenuation level may correspond to the first level of the amplitude of the input signal 402. A second attenuation level may correspond to the second level of the amplitude of the input signal 402.

The calibration device 400 may further include an integrator, e.g. an integrator 505a, 505b as described below with respect to FIGS. 5 and 7. The integrator 505a, 505b may be configured to integrate the first output signal 406a, 406b and the second output signal 406a, 406b. Note that the output signals 406a, 406b represent the I-channel output signal 406a and the Q-channel output signal 406b. The first output signal corresponds to a first time interval of the output signals 406a, 406b in which a first signal level, e.g. a high level Code_H as described below with respect to FIG. 6 is provided by the signal driver 403 to the input 420 of the mixing stage 401. The second output signal corresponds to a second time interval of the output signals 406a, 406b in which a second signal level, e.g. a low level Code_L as described below with respect to FIG. 6 is provided by the signal driver 403 to the input 420 of the mixing stage 401.

The synchronization unit 501 may be configured to synchronize the integration of the first output signal with the integration of the second output signal based on the synchronization clock 825.

Figure 5:
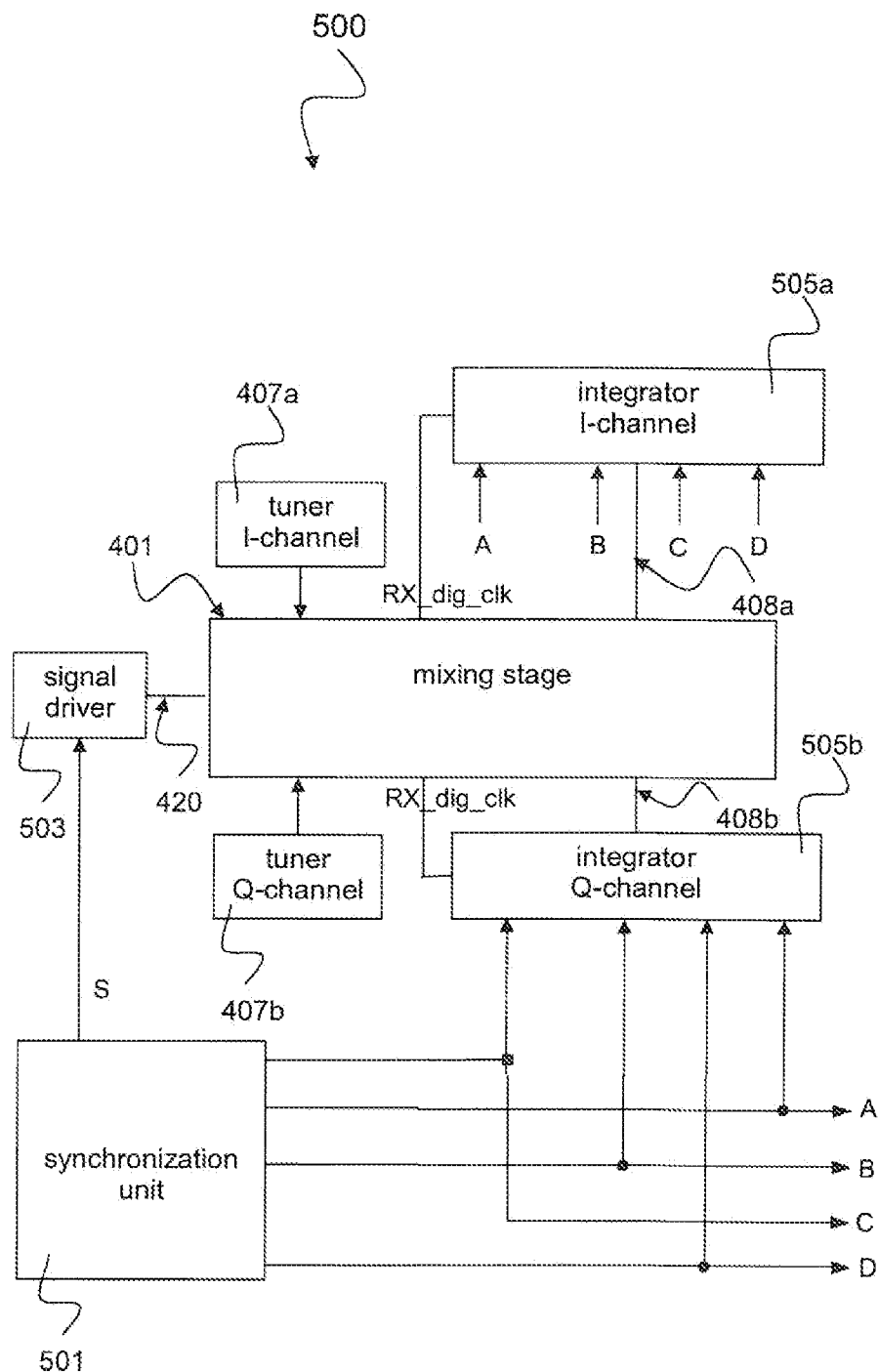
FIG. 5 is a schematic diagram of a radio receiver 500 in accordance with the disclosure.

FIG. 5 is a schematic diagram of a radio receiver 500 in accordance with the disclosure.

The radio receiver 500 may include a mixing stage 401, e.g. corresponding to the mixing stage 401 described above with respect to FIG. 4, a signal driver 503, e.g. corresponding to the signal driver 403 described above with respect to FIG. 4, I- and Q-channel tuners 407a, 407b, e.g. corresponding to the I- and Q-channel tuners 407a, 407b described above with respect to FIG. 4, I- and Q-channel integrators 505a, 505b, e.g. corresponding to the 1- and Q-channel signal detectors 405a. 405b or first and second signal detectors 405a, 405b described above with respect to FIG. 4, and a synchronization unit 501.

The signal driver 503, the I- and Q-channel tuners 407a, 407b, the I- and Q-channel integrators 505a, 505b and the synchronization unit 501 may form a calibration device to calibrate the radio receiver 500.

The signal driver 503, the I- and Q-channel tuners 407a, 407b and the I- and Q-channel integrators 505a, 505b also referred to as I- and Q-channel signal detectors may be coupled to the mixing stage 401 as described above with respect to FIG. 4.

The synchronization unit 501 may provide a first synchronization signal S for synchronizing the signal driver 503 and a second A, third B, fourth C and fifth D synchronization signal for synchronizing the I- and Q-channel integrators 505a, 505b.

The mixing stage 401 may include a complex mixing stage including an I-channel and a Q-channel as described above with respect to FIG. 4. The complex mixing stage 401 may include a local oscillator LO1 419. The complex mixing stage 401 may be configured to mix an input signal 402 at a mixing stage input 420 to provide an in-phase mixed signal 406a at a first channel output 408a and a quadrature mixed signal 406b at a second channel output 408b.

The signal driver 503 may be coupled to the mixing stage input 420. The signal driver 503 may be configured to drive the mixing stage input 420 with an input signal 402, wherein an amplitude of the input signal 402 may be switched between a first level and a second level, e.g. a first level Code_H 607a and a second level Code_L 607b as described below with respect to FIG. 6. A frequency of switching the amplitude may be smaller, in particular much smaller than a carrier frequency of the input signal 402.

The first signal detector 505a may be coupled to the first channel output 408a. The first signal detector 505a may be configured to detect at the first channel output 408a a first channel first output signal 406a responsive to the driving of the mixing stage input 420 with the input signal 402, wherein the amplitude of the input signal 402 is switched to the first level Code_H 607a. The first signal detector 505a may be configured to detect at the first channel output 408a a first channel second output signal 406a responsive to the driving of the mixing stage input 420 with the input signal 402, wherein the amplitude of the input signal 402 is switched to the second level Code_L 607b.

The second signal detector 405b may be coupled to the second channel output 408b. The second signal detector 405b may be configured to detect at the second channel output 408b a second channel first output signal 406b responsive to the driving of the mixing stage input 420 with the input signal 420, wherein the amplitude of the input signal 420 is switched to the first level Code_H 607a and a second channel second output signal 406b responsive to the driving of the mixing stage input 420 with the input signal 402, wherein the amplitude of the input signal 402 is switched to the second level Code_L 607b.

The tuner 407a, 407b may be configured to tune at least one operational parameter of the mixers 403a, 403b of the complex mixing stage 401 in accordance with an optimization criterion with respect to the first channel first output signal 406a, the first channel second output signal 406a, the second channel first output signal 406b, and the second channel second output signal 406b.

Note that the first channel first output signal 406a, the first channel second output signal 406a, the second channel first output signal 406b, and the second channel second output signal 406b represent the I-channel output signal 406a and the Q-channel output signal 406D. The first channel first output signal corresponds to a first time interval of the I-channel output signal 406a in which a first signal level, e.g. a high level Code_H as described below with respect to FIG. 6 is provided by the signal driver 403 to the input 420 of the mixing stage 401. The first channel second output signal corresponds to a second time interval of the I-channel output signal 406a in which a second signal level, e.g. a low level Code_L as described below with respect to FIG. 6 is provided by the signal driver 403 to the input 420 of the mixing stage 401.

Figure 6:
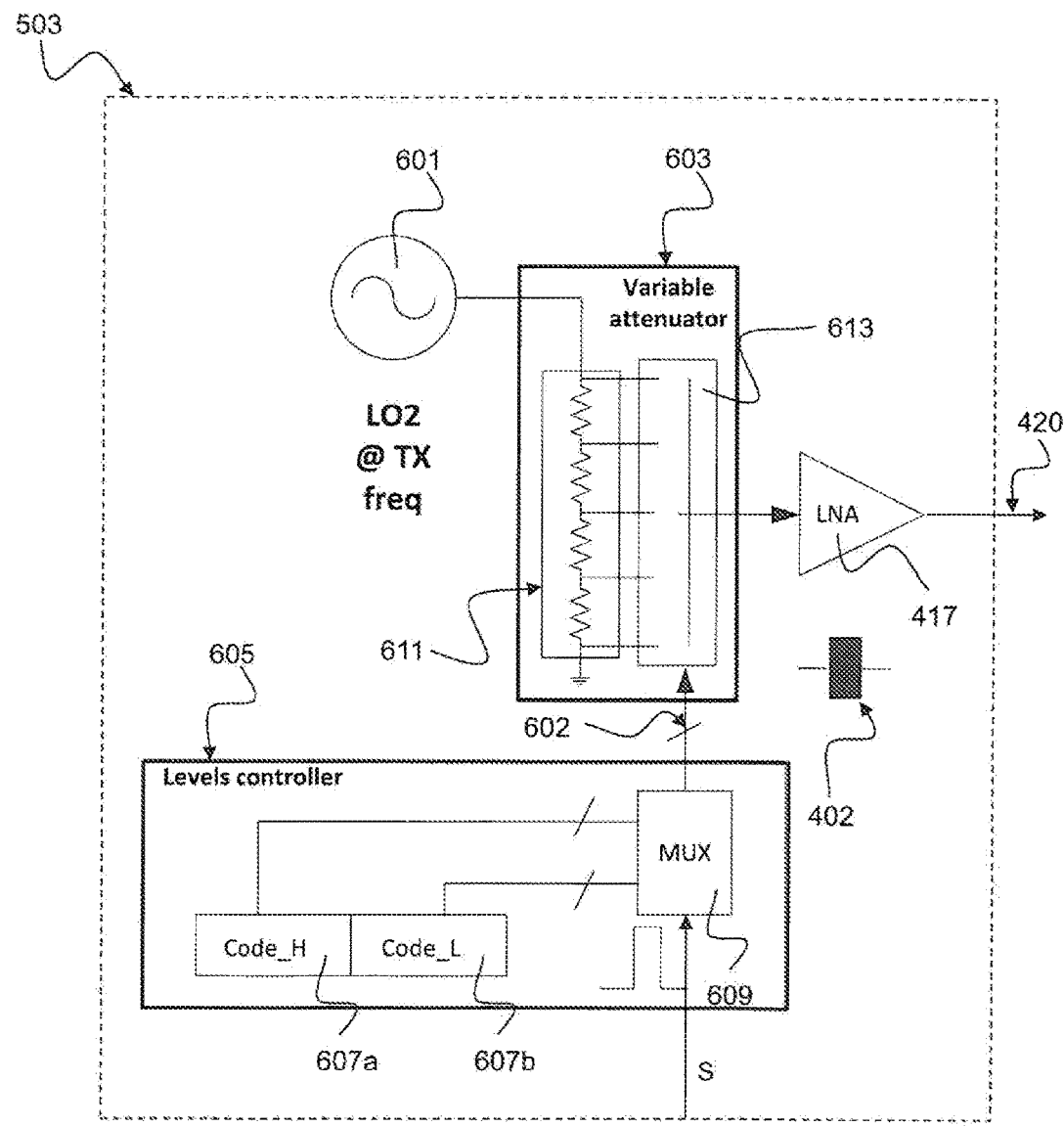
FIG. 6 is a schematic diagram of a signal driver 503 of the radio receiver 500 depicted in FIG. 5 in accordance with the disclosure.

Similarly, the second channel first output signal corresponds to a first time interval of the Q-channel output signal 406b in which a first signal level, e.g. a high level Code_H as described below with respect to FIG. 6 is provided by the signal driver 403 to the input 420 of the mixing stage 401. The second channel second output signal corresponds to a second time interval of the Q-channel output signal 406b in which a second signal level, e.g. a low level Code_L as described below with respect to FIG. 6 is provided by the signal driver 403 to the input 420) of the mixing stage 401.

The optimization criterion may be based on a minimum of sum of difference between the first channel first output signal 406a and the first channel second output signal 406a and difference between the second channel first output signal 406b and the second channel second output signal 406b.

The radio receiver 500 may include a switch that may be configured to switch the mixing stage input 420 between the signal driver 503 and a receive port connectable to a receive antenna.

The radio receiver 500 may further include a second local oscillator, e.g. a local oscillator LO2 601 as described below with respect to FIG. 6 that may be tuned to a transmitter frequency, wherein the input signal 402 may be generated based on a frequency of the second local oscillator LO2 601. The radio receiver 500 may further include a low frequency clock, e.g. a clock 825 as described below with respect to FIG. 8 for synchronizing the signal driver 503 switching the amplitude of the input signal 402 between the first level Code_H 607a and the second level Code_L 607b.

FIG. 6 is a schematic diagram of a signal driver 503 of the radio receiver 500 depicted in FIG. 5 in accordance with the disclosure.

The signal driver 503 may include a (second) local oscillator LO2 601, a variable attenuator 603 and a levels controller 605. The low noise amplifier 417 as described above with respect to FIG. 4 may be implemented within the signal driver 503 or between signal driver 503 and mixing stage input 420 or be a part of mixing stage 420.

The local oscillator LO2 601 may be different from the local oscillator LO1 419 of the mixing stage 401. The local oscillator LO2 601 may oscillate with a frequency corresponding to a frequency of the transmitter (TX) carrier signal or at least close to that frequency.

The levels controller 605 may include a multiplexer 609 to multiplex a first code word Code_H 607a with a second code word Code_L 607b to generate a level signal 602 that may be provided to the variable attenuator 603. The multiplexing shall be based on the synchronization signal S received from the synchronization unit 501 as described above with respect to FIG. 5.

The variable attenuator 603 may attenuate the level signal 602 received from the levels controller 605 by a variable attenuation 613 to provide an output signal 402 that may be coupled directly or via the low noise amplifier 417 to the input 420 of the mixing stage 401. The variable attenuation 613 may be adjusted by for example a resistor or any other attenuation art stage 611 controlled by the local oscillator LO2 601.

In the following, an exemplary function of the signal driver 503 is described. To create an input signal 402 with pulse modulation a second RX local oscillator (LO2) 601 may be used. The oscillator LO2 601 may be tuned to the wanted TX frequency, i.e. the carrier frequency of the transmit signal or possible close to it. An amplitude manipulation may be created by using a switchable signal attenuator 603. Different high 607a and low 607b levels for measurement intervals can be selected using the variable attenuator 603 and the levels controller 605.

Usage of different levels of input signal 402 allows selection of best possible levels for each mixer 403a, 403b during IM2 measurements. A changing magnitude of input signal 402 drives to changing IM2 product. That IM2 product can be seen as DC steps at the differential mixer's outputs 408a, 408b. The DC steps can be measured as power of its main tone, e.g. by using an FFT unit or more simple by measuring difference between DC levels during high and low parts of input signal 402 as shown FIGS. 9 and 10 described below.

Figure 7:
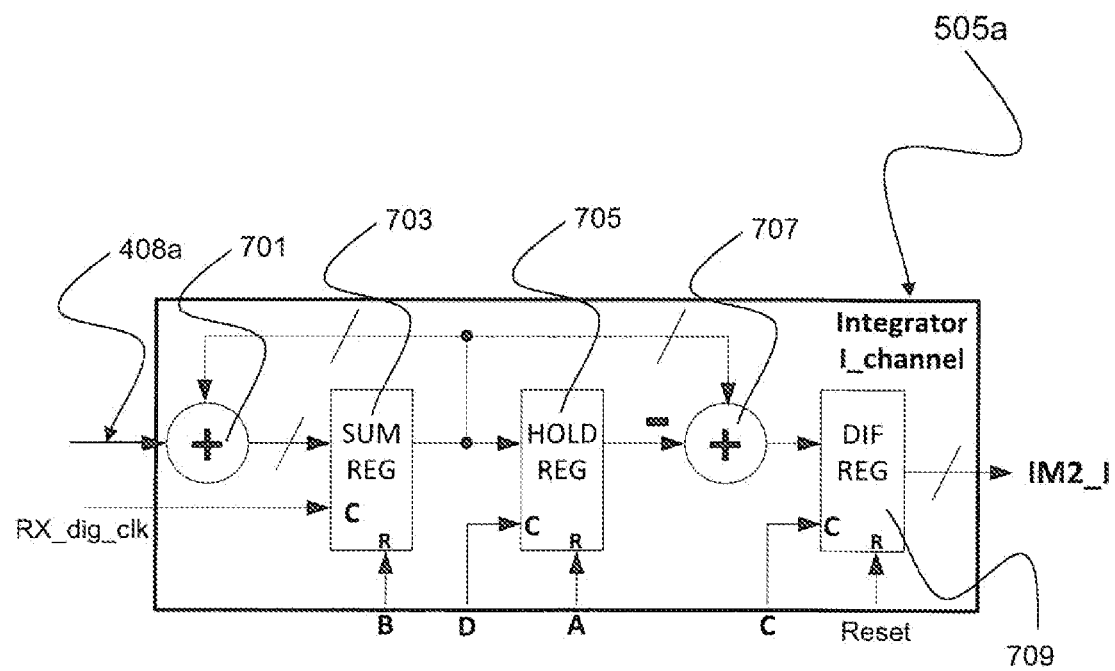
FIG. 7 is a schematic diagram of a signal detector 505a of the radio receiver 500 depicted in FIG. 5 in accordance with the disclosure.

FIG. 7 is a schematic diagram of a signal detector 505a of the radio receiver 500 depicted in FIG. 5 in accordance with the disclosure.

The signal detector 505a, also referred to as integrator, may correspond to the signal detector 505a and/or the signal detector 405a as described above with respect to FIGS. 4 and 5. While the signal detector 505a depicted in FIG. 7 is an I-channel signal detector, a Q-channel signal detector may have the same structure.

The signal detector 505a may include a first input coupled to the output 408a of the gain element 411a of the I-channel RX signal chain 407a to receive the I-channel RX output signal 409a. The signal detector 505a may include a second input to receive the RX digital clock signal RX_dig_clk. The signal detector 505a may include a third, fourth, fifth and sixth input to receive the synchronization signals B, D, A and C from the synchronization unit 501. The signal detector 505a may include a seventh input to receive a reset signal.

The signal detector 505a may include a first (SUM) register 703, a second (HOLD) register 705 and a third (DIF) register 709 and a first 701 and second 707 adding unit. The first adding unit 701 may add the I channel RX output signal 406a and an output signal of the first register 703 based on the digital clock signal RX_dig_clk to provide an add signal to the first register 703. The SUM register 703 may sum the add (integrated) signal on every rise or tall of the RX_dig_clk signal at its data input reset by the synchronization signal B as provided by the synchronization unit 501 and provide a sum (integration) signal to the HOLD register 705. The HOLD register 705 may hold the sum (integration) signal triggered by the synchronization signals D and reset with signal A as provided by the synchronization unit 501. The second adding unit 707 may subtract the output signal of the HOLD register 705 from the output signal of the SUM register 703 and provide a difference signal to the DIF register 709. The DIF register may provide the difference signal triggered by the synchronization signal C as provided by the synchronization unit 501 and reset with a reset signal. The DIF signal may be provided at an output of the signal detector 505a and can be used for detecting an in-phase part of second order intermodulation products IM2_I.

In the following, an exemplary function of the signal detector 505a is described. Signal samples of RX signal 406a after low-frequency filtration (by the first adding unit 701) may be integrated in SUM Register 703 during first (high) half of RF manipulation. When RF magnitude is changed to low, the integrated DC value may be stored into HOLD Register 705. During second (low) half of RF manipulation integrated SUM may be subtracted from stored hold value. When second half of RF manipulation is finished, the difference between the high and low integrated sums may be stored into DIF Register 709 to be used for searching of best IM2 setting.

The low pass filters (409a, 409b as shown in FIG. 4) in signal chain (407a, 707b as shown in FIG. 4) may have long settling time. During this time integration may be prohibited to minimize the error. Prohibiting the integration may be controlled by the synchronization unit 501 as shown in FIGS. 8 to 10 below. To increase signal to noise ratios during DC measurements an average or integration of DC levels may be used as shown in FIG. 10.

FIG. 8 is a schematic diagram of a synchronization unit 501 of the radio receiver 500 depicted in FIG. 5 in accordance with the disclosure.

The synchronization unit 501 includes two serially coupled flip-flops 801, 803 triggered by a clock signal 825. A first output Q of the second flip-flop 803 provides the first synchronization signal S that may be provided to the signal driver 503 as depicted in FIG. 5. A combinational logic of a third 805, fourth 807 and fifth 809 flip-flop, a first 811, second 813, third 815 and fourth 817 AND gate, an inverter 821 and an OR gate 819 may provide the second, third, fourth and fifth synchronization signals A, B, C, D based on the two outputs Q and $\overline{Q}$ of the second flip-flop 803 and the clock signal 825. The synchronization signals A, B, C, D may be provided to the signal detectors 505a, 505b as depicted in FIG. 5.

Figure 9A:
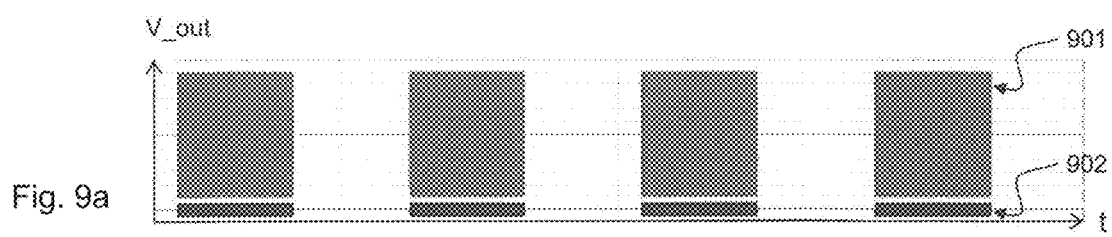
FIGS. 9a, 9b, 9c are schematic diagrams illustrating exemplary signals 900 at a signal input and a signal output of the mixing stage 401 of the radio receiver 500 depicted in FIG. 5 in accordance with the disclosure.
Figure 9B:
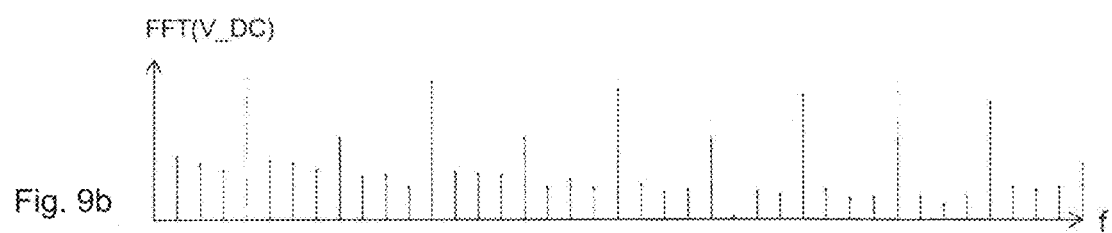
Figure 9C:
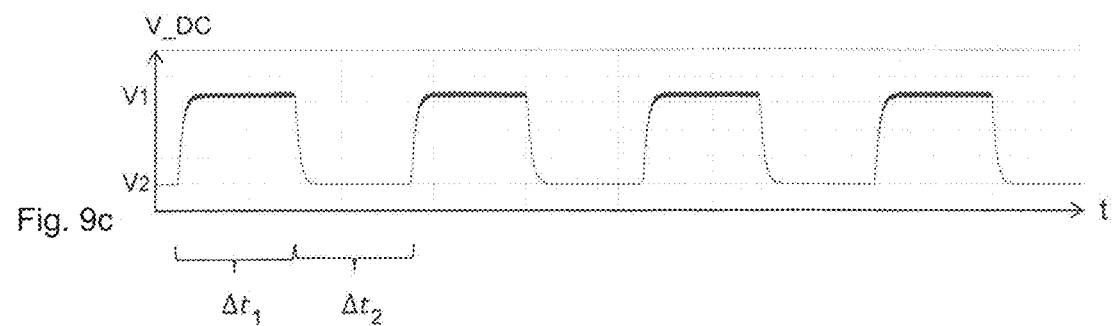

FIGS. 9a, 9b, 9c are schematic diagrams illustrating exemplary signals 900 at a signal input and a signal output of the mixer 403a, 403b of the mixing stage 401 of the radio receiver 500 depicted in FIG. 5 in accordance with the disclosure.

FIG. 9a shows the pulse-modulated input signal 901 of the mixer 403a, 403b that may correspond to the input signal 402 at the input 420 of the miring stage 401 and the mixer output signal 902 that may correspond to the I channel mixer output signal 404a or the Q channel mixer output signal 404b or a combination of both mixer output signals 404a, 404b.

FIG. 9b shows an FFT (Fast Fourier Transform) representation of the low frequency part of the mixer output signal 902. FIG. 9c shows DC levels at mixer output 408a, 408b that may correspond to the I channel RX output signal 406a or the Q channel RX output signal 406b. A first DC level $V_1$ may be obtained in response to an input signal 402 of the mixing stage 401 with a first level (e.g. high) amplitude based on a first code word Code_H (High Code Word) 607a driven by the signal driver 503 during a first time interval $\Delta t_1$. A second DC level $V_2$ may be obtained in response to an input signal 402 of the mixing stage 401 with a second level (e.g. low) amplitude based on a second code word Code_L (Low Code Word) 607b driven by the signal driver 503 during a second time interval $\Delta t_2$.

Between the first DC level V and the second DC level $V_2$ and vice versa transient effects can be seen in FIG. 9c that may be mainly caused by the low pass filters 409a, 409b in the I- and Q-channel RX signal chains 407a, 407b. When measuring the two DC levels $V_1$ and $V_2$ the synchronization unit 501 may be used to consider the transient effects by controlling the signal detectors 505a, 505b to take measurements after the transient effects are finished. An exemplary implementation of the synchronization unit 501 and the generated synchronization signals A, B, C, D, S is described below with respect to FIG. 10.

Figure 10:
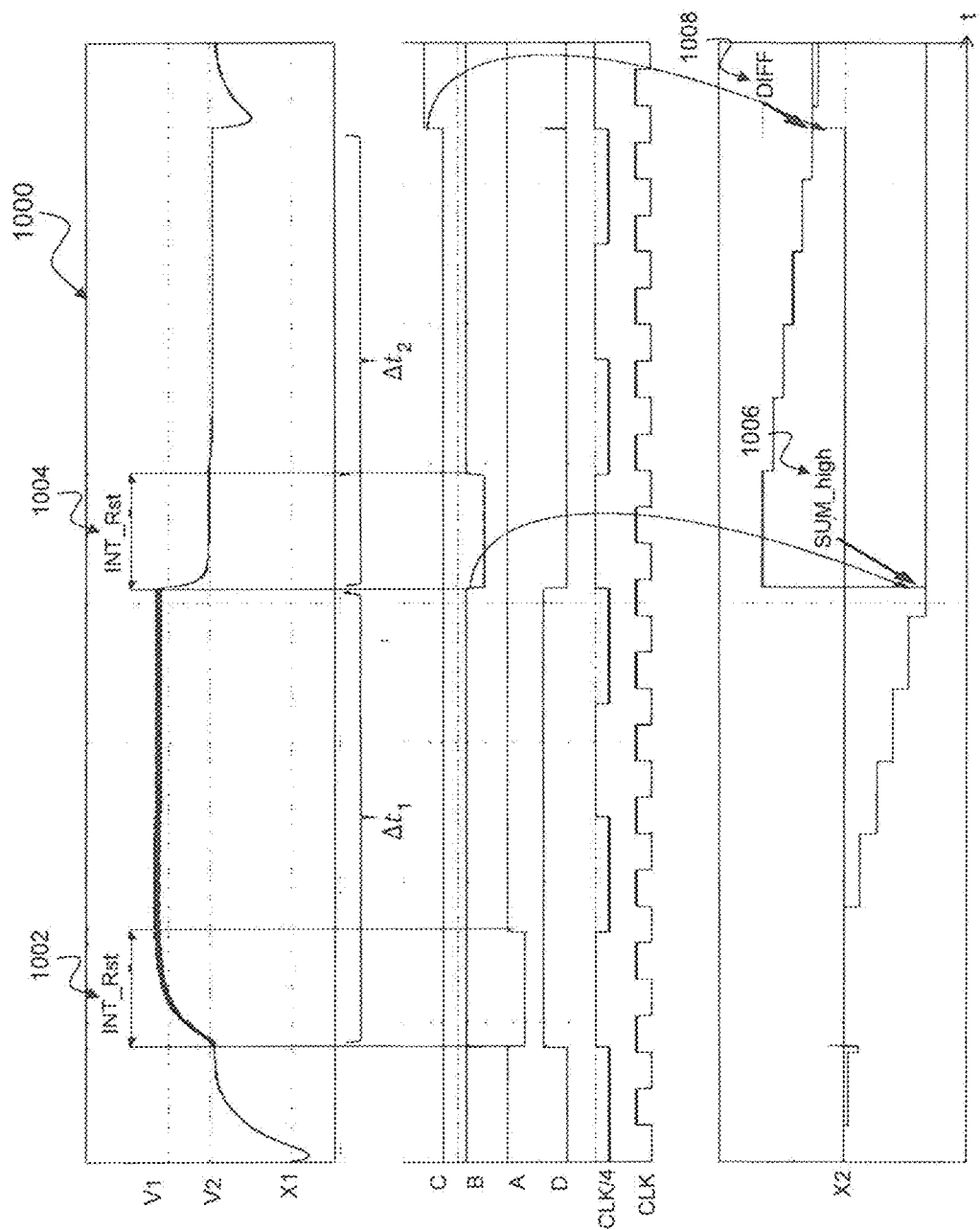
FIG. 10 is a schematic diagram 1000 illustrating exemplary time diagrams 1000 of the synchronization unit 501 of the radio receiver 500 depicted in FIG. 5 in accordance with the disclosure.

FIG. 10 is a schematic diagram 1000 illustrating exemplary time diagrams 1000 of the synchronization unit 501 of the radio receiver 500 depicted in FIG. 5 in accordance with the disclosure.

A first signal X1 may correspond to the I channel RX output signal 406a or the Q channel RX output signal 406b in which a first DC level $V_1$ is reached after a transient time 1002 during the first time interval $\Delta t_1$ and a second DC level $V_2$ is reached after a transient time 1004 during the second time interval $\Delta t_2$. The transient time intervals and the DC levels may correspond to the transient time intervals and the DC levels as described above with respect to FIG. 9. The transient time 1002 during the first time interval $\Delta t_1$ may also be referred to as first LPF settling time 1002. The transient time 1004 during the second time interval $\Delta t_2$ may also be referred to as second LPF settling time 1004.

The synchronization signal D may be generated based on the clock signal CLK, e.g. by counting a number of clock periods. The synchronization signal D may be used to indicate the first time interval $\Delta t_1$ and/or the second time interval $\Delta t_2$.

The synchronization signal A may be generated based on the synchronization signal D, e.g. the rising edge of signal D, and the clock signal CLK or CLK/4. The synchronization signal A may be used to indicate the first LPF settling time INT_Rst 1002 during the first time interval $\Delta t_1$.

The synchronization signal B may be generated based on the synchronization signal D, e.g. the falling edge of signal D, and the clock signal CLK or CLK/4. The synchronization signal B may be used to indicate the second LPF settling time INT_Rst 1004 during the second time interval $\Delta t_2$. The synchronization signal B may be used to indicate the trigger time 1006 for saving the integration value SUM_high of the first DC level $V_1$ over the first time interval $\Delta t_1$, e.g. the trigger time for triggering the SUM register 703 of the integrators 505a, 505b depicted in FIG. 7 to provide the result to the HOLD register 705 and to perform a reset. During the first LPF settling time INT_Rst 1002 and the second LPF settling time INT_Rst 1004, the integrators 505a, 505b may be reset to begin the integration process from zero start point.

The synchronization signal C may be generated based on the synchronization signal D and the clock signal CLK or CLK/4. The synchronization signal C may be used to indicate the trigger time for saving the integration value SUM_low of the second DC level $V_2$ over the second time interval $\Delta t_2$, e.g. the trigger time for triggering the SUM register 703 of the integrators 505a, 505b depicted in FIG. 7 to provide the result to the HOLD register 705 and to perform a reset. The synchronization signal C may further be used to indicate the trigger time 1008 to calculate the difference DIFF between the first DC level $V_1$ and the second DC level $V_2$, e.g. the trigger time for triggering the DIF register 709 of the integrators 505a, 505b depicted in FIG. 7. Exemplary values of the difference DIFF for different operating parameters of the mixers 403a, 403b are illustrated in FIG. 11 shown below.

IM2 measurements may be performed for both, I and Q Mixers 403a, 403b in parallel to save calibration time or as two-dimensional complex measurement using square sum of I and Q Mixers output signals. Therefore, there may be two separate integrators or signal detectors 505a, 505b for I and Q channels. The synchronization unit may be common for both channels.

Figure 11:
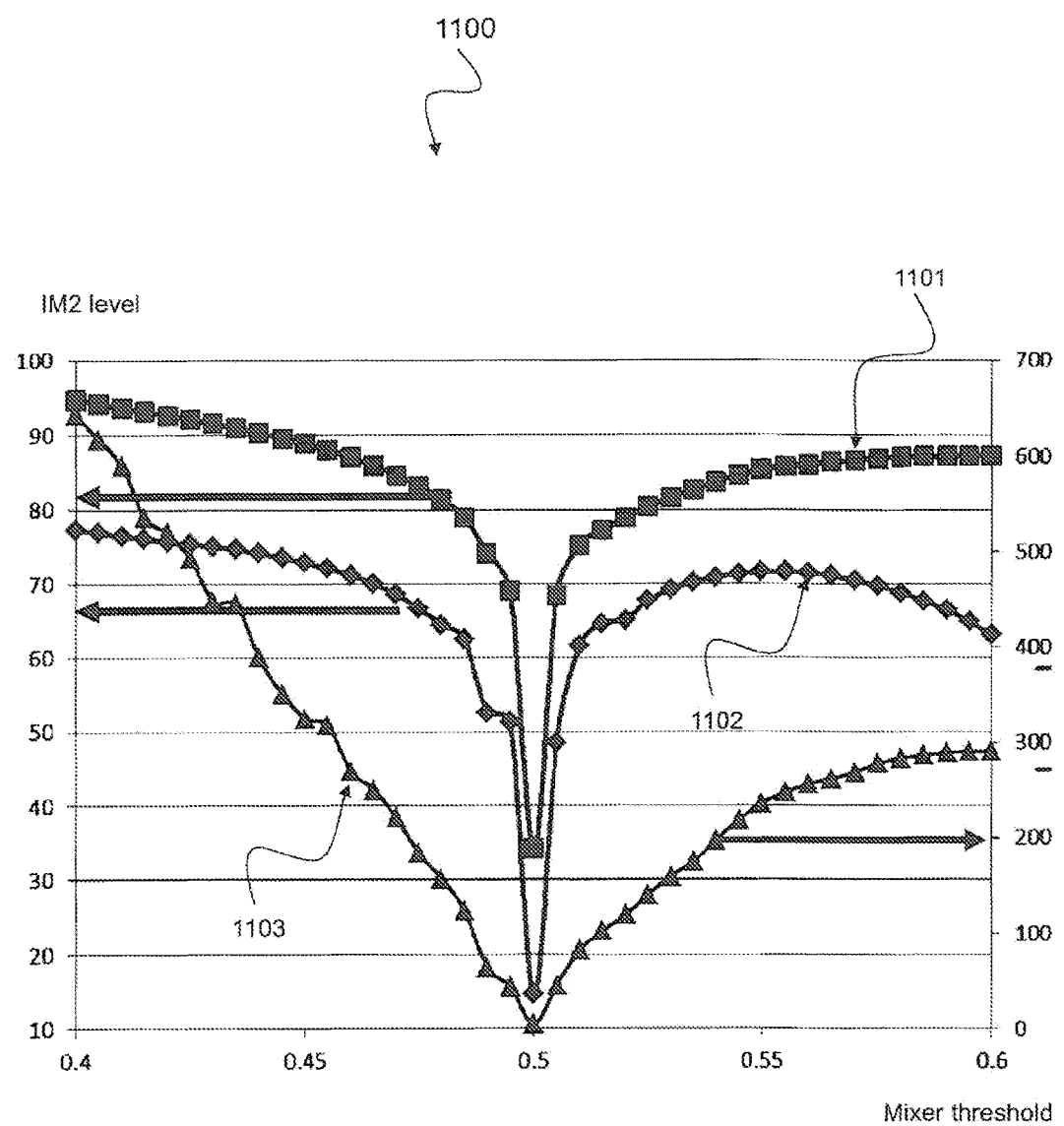
FIG. 11 is a schematic diagram 1100 illustrating exemplary simulation results of the performance of a method 300 as depicted in FIG. 3 for determining intermodulation distortions in accordance with the disclosure.

FIG. 11 is a schematic diagram 1100 illustrating exemplary simulation results of the performance of a method 300 as depicted in FIG. 3 for determining intermodulation distortions in accordance with the disclosure.

Special simulations were performed using a real mixer model. Simulation results (IM2 levels versa Mixer threshold sweep) using conventional two-tone measurements 1101 and measurements 1102, 1103 using the method 300 described above with respect to in FIG. 3 are shown in FIG. 11.

The first curve 1101 illustrates IM2 sweep using conventional two-tone measurements. Measurements are given as FFT level of the main tone. The second curve 1102 illustrates IM2 sweep using the method 300 when measurements are given as FFT level of main tone of DC differential signal. The third curve 1103 illustrates IM2 sweep using the method 300 when measurements are given as voltage difference between DC levels during the two parts ($\Delta t_1$ and $\Delta t_2$ as described above with respect to FIGS. 9 and 10) of RF manipulated signal.

Implementing methods and devices according to the disclosure allows IM2 measurement without the need of using external TX signals or routing own TX signal into RX area (isolation problems). Methods and devices according to the disclosure require minimum additional analogue sub-blocks. Only a variable attenuator may be required, e.g. a variable attenuator 603 as described above with respect to FIG. 6. All other blocks may be simple low frequency digital units and may be implemented using negligible amount of additional chip area. Methods and devices according to the disclosure may not require complicated analogue units like for example modulation DAC, analogue modulators (to generate own two-tone signal) etc.

An implementation of methods and devices according to the disclosure may be detected by checking if any kind of real-time IM2 compensation/calibration is implemented and by checking if an RX LO with magnitude manipulated signals is used for IM2 measurements.

IM2 measurement and calibration is an important RX feature for direct down-conversion receivers. By applying methods and devices according to the disclosure alternative solutions such as factory calibration of IM2 products, usage of TX signals for real-time IM2 measurements and usage of complicated analogue modulation units to create two-tone signals on-board may be avoided.

EXAMPLES

The following examples pertain to further embodiments. Example 1 is a method for determining inter-modulation distortions of a mixing stage, the method comprising: driving a signal input of the mixing stage based on an input signal, wherein an amplitude of the input signal is switched between a first level and a second level, and wherein a frequency of switching the amplitude is smaller than a frequency of the input signal; detecting at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and determining the inter-modulation distortions based on the difference between first output signal and the second output signal.

In Example 2, the subject matter of Example 1 can optionally include that the inter-modulation distortions are determined based on a difference between the first output signal and the second output signal.

In Example 3, the subject matter of any one of Examples 1-2 can optionally include that operational parameters of the mixing stage are maintained between successive first levels and second levels of the amplitude of the input signal.

In Example 4, the subject matter of Example 3 can optionally include that the operational parameters of the mixing stage are modified when the amplitude of the input signal is switched from the second level to the first level.

In Example 5, the subject matter of any one of Examples 3-4 can optionally include that the operational parameters of the mixing stage comprise at least one of a DC voltage, a bias current, a mixing stage threshold, and a mixing stage symmetry parameter.

In Example 6, the subject matter of any one of Examples 1-5 can optionally include that a rime interval for switching the amplitude of the input signal to the first level or to the second level is greater than a low pass filter settling time of the mixing stage.

Example 7 is a method for tuning a mixing stage, the method comprising: driving a signal input of the mixing stage with an input signal, wherein an amplitude of the input signal is switched between a first level and a second level, and wherein a frequency of switching the amplitude is smaller than a frequency of the input signal; detecting at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and tuning at least one operational parameter of the mixing stage in accordance with an optimization criterion with respect to the first output signal and the second output signal.

In Example 8, the subject matter of Example 7 can optionally include that the at least one operational parameter of the mixing stage is maintained between successive first levels and second levels of the amplitude of the input signal and modified when the amplitude of the input signal is switched from the second level to the first level.

In Example 9, the subject matter of any one of Examples 7-8 can optionally include that the optimization criterion is based on a minimum difference between the first output signal and the second output signal.

In Example 10, the subject matter of any one of Examples 7-9 can optionally include switching the mixing stage to a calibration mode in which the mixing stage is disabled for receiving payload signals when performing the tuning of the mixing stage.

In Example 11, the subject matter of any one of Examples 7-10 can optionally include calibrating the mixing stage with operational parameters fulfilling the optimization criterion when enabling the mixing stage for receiving payload signals.

Example 12 is a calibration device for calibrating a mixing stage comprising a signal input and a signal output, the calibration device comprising: a signal driver connectable to the signal input, wherein the signal driver is configured to drive the signal input with an input signal, wherein an amplitude of the input signal is switched between a first level and a second level, and wherein a frequency of switching the amplitude is smaller than a frequency of the input signals a signal detector connectable to the mixing stage output, wherein the signal detector is configured to detect at the signal output a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and a tuner configured to tune at least one operational parameter of the mixing stage in accordance with an optimization criterion with respect to the first output signal and the second output signal.

In Example 13, the subject matter of Example 12 can optionally include that the optimization criterion is based on a minimum difference between the first output signal and the second output signal.

In Example 14, the subject matter of any one of Examples 12-13 can optionally include a switch configured to switch the signal input of the mixing stage to the signal driver when the mixing stage is in a calibration mode and to switch the signal input of the mixing stage to a receive port configured to receive communication signals when the mixing stage is not in the calibration mode.

In Example 15, the subject matter of any one of Examples 12-14 can optionally include that the calibration device is integrated with the mixing stage on a chips or that the calibration device is an external unit connectable to the mixing stage.

In Example 16, the subject matter of any one of Examples 12-15 can optionally include a synchronization unit configured to synchronize the signal driver between driving the signal input with the input signal, wherein the amplitude of the input signal is switched to the first level, and driving the signal input with the input signal, wherein the amplitude of the input signal is switched to the second level.

In Example 17, the subject matter of Example 16 can optionally include that the synchronization unit comprises a synchronization clock, wherein synchronizing of the signal driver is based on the synchronization clock, and that a frequency of the synchronization clock is smaller than a frequency of a local oscillator of the mixing stage.

In Example 18, the subject matter of Example 17 can optionally include a variable attenuator configured to attenuate the input signal in accordance with an attenuation level; and a level controller configured to control the attenuation level of the variable attenuator.

In Example 19, the subject matter of Example 18 can optionally include that a first attenuation level corresponds to the first level of the amplitude of the input signal; and that a second attenuation level corresponds to the second level of the amplitude of the input signal.

In Example 20, the subject matter of any one of Examples 17-19 can optionally include an integrator configured to integrate the first output signal and the second output signal.

In Example 21, the subject matter of Example 20 can optionally include that the synchronization unit is configured to synchronize the integration of the first output signal with the integration of the second output signal based on the synchronization clock.

Example 22 is a radio receiver, comprising: a complex mixing stage comprising a local oscillator, wherein the complex mixing stage is configured to mix an input signal at a mixing stage input to provide an in-phase mixed signal at a first channel output and a quadrature mixed signal at a second channel output; a signal driver coupled to the mixing stage input, wherein the signal driver is configured to drive the mixing stage input with an input signal, wherein an amplitude of the input signal is switched between a first level and a second level, and wherein a frequency of switching the amplitude is smaller than a frequency of the input signal; a first signal detector coupled to the first channel output, wherein the first signal detector is configured to detect at the first channel output a first channel first output signal responsive to the driving of the mixing stage input with the input signal, wherein the amplitude of the input signal is switched to the first level and a first channel second output signal responsive to the driving of the mixing stage input with the input signal, wherein the amplitude of the input signal is switched to the second level; a second signal detector coupled to the second channel output, wherein the second signal detector is configured to detect at the second channel output a second channel first output signal responsive to the driving of the mixing stage input with the input signal, wherein the amplitude of the input signal is switched to the first level and a second channel second output signal responsive to the driving of the mixing stage input with the input signal, wherein the amplitude of the input signal is switched to the second level; and a tuner configured to tune at least one operational parameter of the complex mixing stage in accordance with an optimization criterion with respect to the first channel first output signal, the first channel second output signal, the second channel first output signal, and the second channel second output signal.

In Example 23, the subject matter of Example 22 can optionally include that the optimization criterion is based on a minimum difference between the first channel first output signal and the first channel second output signal and further based on a minimum difference between the second channel first output signal and the second channel second output signal.

In Example 24, the subject matter of any one of Examples 22-23 can optionally include a switch configured to switch the mixing stage input between the signal driver and a receive port connectable to a receive antenna.

In Example 25, the subject matter of any one of Examples 22-24 can optionally include a second local oscillator tuned to a transmitter frequency, wherein the input signal is generated based on a frequency of the second local oscillator and a low frequency clock synchronizing the signal driver switching the amplitude of the input signal between the first level and the second level.

Example 26 is a computer readable medium on which computer instructions are stored which when executed by a computer, cause the computer to perform the method of one of Examples 1 to 11.

Example 27 is a device for determining inter-modulation distortions of a mixing stage, the device comprising: driving means for driving a signal input of the mixing stage based on an input signal, wherein an amplitude of the input signal is switched between a first level and a second level, and wherein a frequency of switching the amplitude is smaller than a frequency of the input signal; detecting means for detecting at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and determining means for determining the inter-modulation distortions based on the first output signal and the second output signal.

In Example 28, the subject matter of Example 27 can optionally include that the inter-modulation distortions are determined based on a difference between the first output signal and the second output signal.

In Example 29, the subject matter of any one of Examples 27-24 can optionally include that operational parameters of the mixing stage are maintained between successive first levels and second levels of the amplitude of the input signal.

In Example 30, the subject matter of Example 29 can optionally include that the operational parameters of the mixing stage are modified when the amplitude of the input signal is switched from the second level to the first level.

In Example 31, the subject matter of any one of Examples 29-30 can optionally include that the operational parameters of the mixing stage comprise at least one of a DC voltage, a bias current, a mixing stage threshold, and a mixing stage symmetry parameter.

In Example 32, the subject matter of any one of Examples 27-31 can optionally include that a time interval for switching the amplitude of the input signal to the first level or to the second level is greater than a low pass filter settling time of the mixing stage.

Example 33 is a device for tuning a mixing stage, the device comprising: driving means for driving a signal input of the mixing stage with an input signal, wherein an amplitude of the input signal is switched between a first level and a second level, and wherein a frequency of switching the amplitude is smaller than a frequency of the input signal; determining means for detecting at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and tuning means for tuning at least one operational parameter of the mixing stage in accordance with an optimization criterion with respect to the first output signal and the second output signal.

In Example 34, the subject matter of Example 33 can optionally include that the at least one operational parameter of the mixing stage is maintained between successive first levels and second levels of the amplitude of the input signal and modified when the amplitude of the input signal is switched from the second level to the first level.

In Example 35, the subject matter of any one of Examples 33-34 can optionally include that the optimization criterion is based on a minimum difference between the first output signal and the second output signal.

In Example 36, the subject matter of any one of Examples 33-35 can optionally include switching means for switching the mixing stage to a calibration mode in which the mixing stage is disabled for receiving payload signals when performing the tuning of the mixing stage.

In Example 37, the subject matter of any one of Examples 33-36 can optionally include calibrating means for calibrating the mixing stage with operational parameters fulfilling the optimization criterion when enabling the mixing stage for receiving communication signals.

Example 38 is a transmission system, comprising: a radio transmitter and radio receiver, wherein the radio receiver comprises a calibration device according to any one of Examples 12-21.

In Example 39, the subject matter of Example 38 can optionally include that the radio receiver is configured to process a receive signal received at a receive port in response to a transmit signal transmitted at the radio transmitter.

Example 40 is a direct down-conversion receiver, comprising: a calibration device according to any one of Examples 12-21.

In Example 41, the subject matter of Example 40 can optionally include that the direct down-conversion receiver is configured to activate the calibration device when the direct down-conversion receiver indicates a testing state.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A method for tuning a mixing stage, the method comprising:
    driving a signal input of the mixing stage with an input signal, wherein an amplitude of the input signal is switched between a first level and a second level, and wherein a frequency of switching the amplitude is smaller than a frequency of the input signal;
    detecting at a signal output of the mixing stage a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and
    tuning at least one operational parameter of the mixing stage in accordance with an optimization criterion with respect to the first output signal and the second output signal.

2. The method of claim 1, wherein the at least one operational parameter of the mixing stage is maintained between successive first levels and second levels of the amplitude of the input signal and modified when the amplitude of the input signal is switched from the second level to the first level.

3. The method of claim 1, wherein the optimization criterion is based on a minimum difference between the first output signal and the second output signal.

4. The method of claim 1, further comprising:
    switching the mixing stage to a calibration mode in which the mixing stage is disabled for receiving communication signals when performing the tuning of the mixing stage.

5. The method of claim 1, further comprising:
calibrating the mixing stage with operational parameters fulfilling the optimization criterion when enabling the mixing stage for receiving payload signals.

6. A calibration device for calibrating a mixing stage comprising a signal input and a signal output, the calibration device comprising:
a signal driver couplable to the signal input, wherein the signal driver is configured to drive the signal input with an input signal, wherein an amplitude of the input signal is switched between a first level and a second level, and wherein a frequency of switching the amplitude is smaller than a frequency of the input signal;
a signal detector couplable to the mixing stage signal output, wherein the signal detector is configured to detect at the signal output a first output signal responsive to the driving of the signal input with the input signal, wherein the amplitude of the input signal is switched to the first level, and a second output signal responsive to the driving of the signal input with the input signal, wherein the amplitude of the input signal is switched to the second level; and
a tuner configured to tune at least one operational parameter of the mixing stage in accordance with an optimization criterion with respect to the first output signal and the second output signal.

7. The calibration device of claim 6, wherein the optimization criterion is based on a minimum difference between the first output signal and the second output signal.

8. The calibration device of claim 6, further comprising:
a switch configured to switch the signal input of the mixing stage to the signal driver when the mixing stage is in a calibration mode and to switch the signal input of the mixing stage to a receive port configured to receive communication signals when the mixing stage is not in the calibration mode.

9. The calibration device of claim 6, wherein
the calibration device is integrated with the mixing stage on a chip; or
the calibration device is an external unit couplable to the mixing stage.

10. The calibration device of claim 6, further comprising:
a synchronization unit configured to synchronize the signal driver between driving the signal input with the input signal, wherein the amplitude of the input signal is switched to the first level, and driving the signal input with the input signal, wherein the amplitude of the input signal is switched to the second level.

11. The calibration device of claim 10, wherein
the synchronization unit comprises a synchronization clock, wherein synchronizing of the signal driver is based on the synchronization clock, and
wherein a frequency of the synchronization clock is smaller than a frequency of a local oscillator of the mixing stage.

12. The calibration device of claim 11, wherein the signal driver comprises:
a variable attenuator configured to attenuate the input signal in accordance with an attenuation level; and
a level controller configured to control the attenuation level of the variable attenuator.

13. The calibration device of claim 12, wherein
a first attenuation level corresponds to the first level of the amplitude of the input signal; and
a second attenuation level corresponds to the second level of the amplitude of the input signal.

14. The calibration device of claim 11, further comprising:
an integrator configured to integrate the first output signal and the second output signal.

15. The calibration device of claim 14, wherein the synchronization unit is configured to synchronize the integration of the first output signal with the integration of the second output signal based on the synchronization clock.

16. A radio receiver, comprising:
a complex mixing stage comprising a local oscillator, wherein the complex mixing stage is configured to mix an input signal at a mixing stage input to provide an in-phase mixed signal at a first channel output and a quadrature mixed signal at a second channel output;
a signal driver coupled to the mixing stage input, wherein the signal driver is configured to drive the mixing stage input with an input signal, wherein an amplitude of the input signal is switched between a first level and a second level, and wherein a frequency of switching the amplitude is smaller than a frequency of the input signal;
a first signal detector coupled to the first channel output, wherein the first signal detector is configured to detect at the first channel output a first channel first output signal responsive to the driving of the mixing stage input with the input signal, wherein the amplitude of the input signal is switched to the first level and a first channel second output signal responsive to the driving of the mixing stage input with the input signal, wherein the amplitude of the input signal is switched to the second level;
a second signal detector coupled to the second channel output, wherein the second signal detector is configured to detect at the second channel output a second channel first output signal responsive to the driving of the mixing stage input with the input signal, wherein the amplitude of the input signal is switched to the first level and a second channel second output signal responsive to the driving of the mixing stage input with the input signal, wherein the amplitude of the input signal is switched to the second level; and
a tuner configured to tune at least one operational parameter of the complex mixing stage in accordance with an optimization criterion with respect to the first channel first output signal, the first channel second output signal, the second channel first output signal, and the second channel second output signal.

17. The radio receiver of claim 16, wherein the optimization criterion is based on a minimum difference between the first channel first output signal and the first channel second output signal and further based on a minimum difference between the second channel first output signal and the second channel second output signal.

18. The radio receiver of claim 16, further comprising:
a switch configured to switch the mixing stage input between the signal driver and a receive port couplable to a receive antenna.

19. The radio receiver of claim 16, further comprising:
a second local oscillator tuned to a transmitter frequency, wherein the input signal is generated based on a frequency of the second local oscillator; and
a low frequency clock synchronizing the signal driver switching the amplitude of the input signal between the first level and the second level.

* * * * *